(12) United States Patent
Toyohara

(10) Patent No.: US 6,335,822 B1
(45) Date of Patent: Jan. 1, 2002

(54) DOUBLE CLADDING FIBER AND OPTICAL FIBER AMPLIFIER

(75) Inventor: Atsushi Toyohara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/515,832

(22) Filed: Feb. 29, 2000

(30) Foreign Application Priority Data

Mar. 1, 1999 (JP) .................................................. 11-052828

(51) Int. Cl.⁷ ....................................................... H01S 3/00
(52) U.S. Cl. ..................... 359/341.1; 359/341.3; 359/337
(58) Field of Search .................. 385/123, 126, 385/127, 128; 359/341, 337

(56) References Cited

U.S. PATENT DOCUMENTS

| | | | | |
|---|---|---|---|---|
| 4,820,018 A | * | 4/1989 | Melman et al. | 350/96.33 |
| 5,291,501 A | * | 3/1994 | Hanna | 372/6 |
| 5,469,292 A | * | 11/1995 | Bjarklev et al. | 359/341 |
| 5,485,480 A | * | 1/1996 | Kleinerman | 372/6 |
| 5,491,581 A | * | 2/1996 | Roba | 359/341 |
| 5,708,669 A | * | 1/1998 | DiGiovanni et al. | 372/6 |
| 5,861,973 A | * | 1/1999 | Inagaki et al. | 359/341 |
| 5,970,198 A | * | 1/1999 | Inagaki et al. | 385/127 |
| 5,877,890 A | * | 3/1999 | Snitzer | 359/341 |
| 5,892,615 A | * | 4/1999 | Grubb et al. | 359/341 |
| 5,898,715 A | * | 4/1999 | LeGrange et al. | 372/6 |
| 5,949,941 A | * | 9/1999 | DiGiovanni | 385/127 |
| 6,031,849 A | * | 2/2000 | Ball et al. | 372/6 |
| 6,055,353 A | * | 4/2000 | Aiso | 385/123 |
| 6,151,429 A | * | 11/2000 | Kristensen et al. | 385/11 |
| 6,175,445 B1 | * | 1/2001 | Desthieux et al. | 359/341 |

FOREIGN PATENT DOCUMENTS

| | | | | |
|---|---|---|---|---|
| JP | 10-51050 | 2/1998 | | H01S/3/107 |
| JP | 10-51062 | 2/1998 | | H01S/3/17 |

* cited by examiner

Primary Examiner—Thomas H. Tarcza
Assistant Examiner—Deandra M. Hughes
(74) Attorney, Agent, or Firm—McGinn & Gibb, PLLC

(57) ABSTRACT

A double cladding fiber and an optical fiber amplifier, which have a function equivalent to that of a pumping light cut filter with a simple structure are provided. In the double cladding fiber, a core transmitting a signal light is covered with a first clad having a refractive index of n7b. A second clad having a refractive index of n7c, covers the surrounding surface of the first clad. At an output end of the fiber, a designated length of the second clad is removed and a substance having a refractive index of "n" ("n">n7b) is coated on the first clad where the second clad has been removed. With this structure, a remaining pumping light leaks to this coated part. That is, and the substance coated part works as a filter for the remaining pumping light. As a result, a signal to noise ratio (SNR) of the amplified signal light is improved with a simple structure.

6 Claims, 4 Drawing Sheets

DOUBLE CLADDING FIBER AND OPTICAL FIBER AMPLIFIER

BACKGROUND OF THE INVENTION

1. Field of the Invention

The present invention generally relates to a double cladding fiber and an optical fiber amplifier, in which a leaked pumping light is suppressed in the double cladding fiber as an amplifying medium.

2. Description of the Related Art

In a conventional double cladding fiber and a conventional optical fiber amplifier, a signal is amplified by injecting both the signal light to be amplified and a pumping light providing amplifying action, into an optical fiber being an amplifying medium at the same time. Conventionally, there are three schemes for injecting the signal light and the pumping light. The first one is a forward pumping scheme in which the signal light and the pumping light are injected to the same transmitting direction, and the second one is a backward pumping scheme in which the signal light and the pumping light are injected to the facing direction, and the last one is a bidirectional pumping scheme in which the pumping light is injected from both directions for the signal light.

In the forward pumping scheme in which the pumping light is injected in the transmitting direction of the signal light, or in the bi-directional pumping scheme in which the pumping light is injected from both directions, the signal light and the pumping light are output at the same time to an output end. This pumping light power simply acts as a noise for the signal light power. As a result, a signal to noise ratio (SNR) at the output end is deteriorated.

In order to suppress this kind of deterioration, generally a long wavelength pass filter (LWPF) or a filter called a pumping light cut filter is installed at the output end.

The amplifying medium widely adopted currently is called an erbium doped fiber (EDF) and its structure is composed of a core in which the light is transmitted and a clad covering the core. Furthermore, at the EDF, a high power outputting optical fiber amplifier has been developed, which is considered to be difficult to develop, and for this high power outputting optical fiber, an optical fiber called a double cladding fiber is used as this amplifying medium.

A conventional application can be found in Japanese Patent Application Laid-Open No. HEI 10-51050 which discloses an optical fiber for amplification in which a double cladding fiber for amplification and an optical fiber used generally for transmission are fused together easily. A further conventional application can be found in Japanese Patent Application Laid-Open No. HEI 10-5106 disclosing an optical fiber for amplification in which the influence of a micro-bending loss is reduced and the connecting process of the end of the optical fiber is made to be easy.

However, in the conventional double cladding fibers mentioned above, a plurality of optical fibers are used as the amplifying medium. As a result, there is a problem that the structure becomes complex, in which a double cladding fiber is used with a pumping light cut filter having high efficiency.

SUMMARY OF THE INVENTION

It is therefore an object of the present invention to provide a double cladding fiber and an optical fiber amplifier in which an equivalent function to a pumping light cut filter having high efficiency is realized with a simple structure.

According to a first aspect of the present invention, for achieving the object mentioned above, there is provided a double cladding fiber, which includes a core, whose refractive index is n7a, transmits a signal light, a first clad, whose refractive index is n7b, covers the surrounding surface of the core, and a second clad, whose refractive index is n7c, covers the surrounding surface of the first clad. A designated length of the second clad is removed, and a designated substance, whose refractive index is "n" ("n">n7b), is coated at the part [removed said where the second clad is removed on the first clad.

According to a second aspect of the present invention, in the first aspect, the refractive indices have a relation that n7a>n7b>n7c.

According to a third aspect of the present invention, in the first aspect, a small amount of rare-earth element is doped in the core.

According to a fourth aspect of the present invention, there is provided an optical fiber amplifier, which includes a wavelength division multiplex (WDM) coupler, to which a signal light and a pumping light are inputted, an isolator from which an amplified signal light is outputted, and a double cladding fiber, which connects between the WDM coupler and the isolator, and consists of a core, whose refractive index is n7a, a first clad, whose refractive index is n7b, covering the surrounding surface of the core, and a second clad, whose refractive index is n7c, covering the surrounding surface of the first clad, and a designed substance, whose refractive index is "n" ("n">n7b), is coated at the part removed from the second clad on the first clad.

According to a fifth aspect of the present invention, in the fourth aspect, said refractive indices have a relation that n7a>n7b>n7c.

According to a sixth aspect of the present invention, in the fourth aspect, a small amount of rare-earth element is doped in the core.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
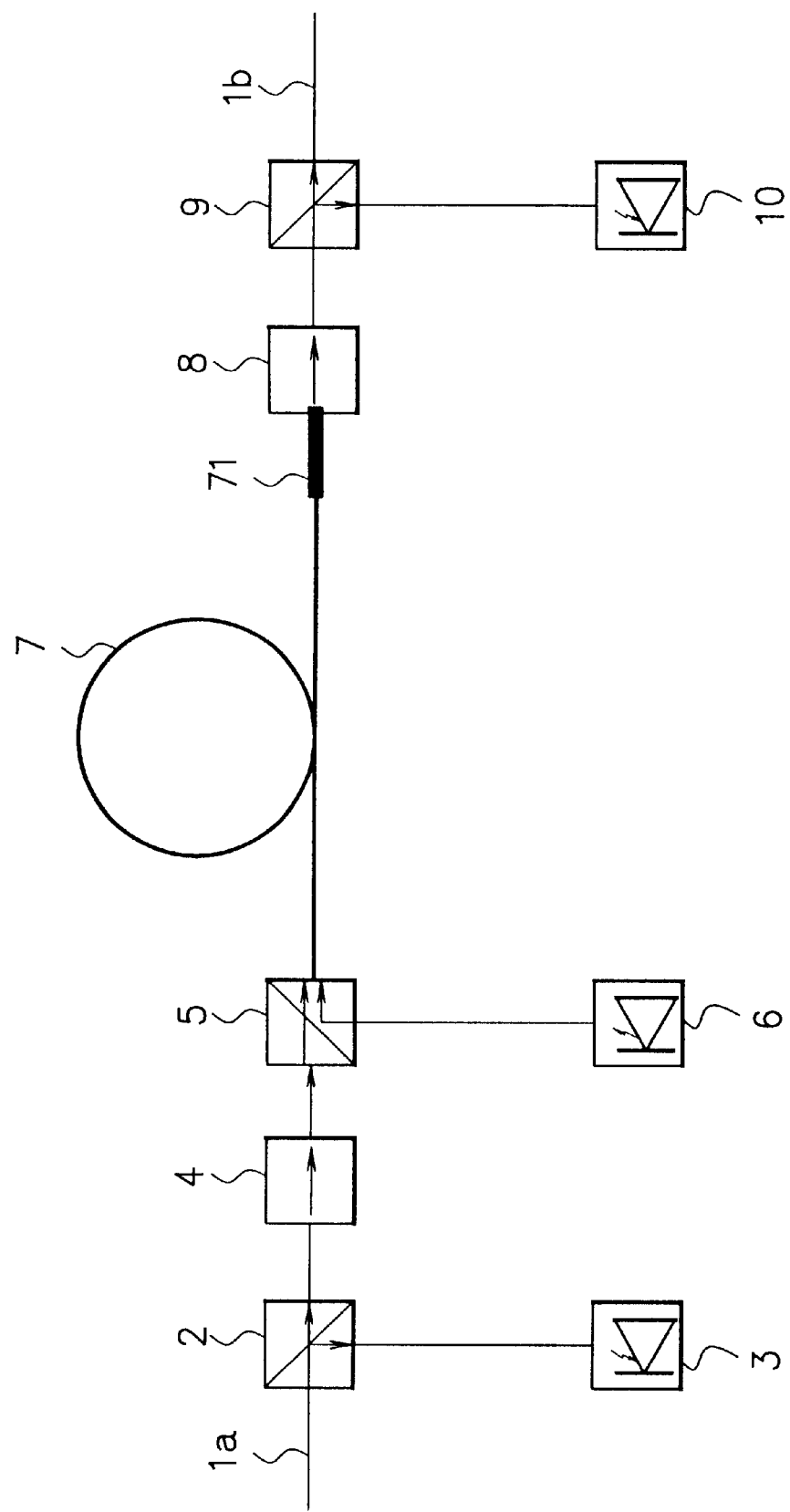
FIG. 1 is a diagram showing a structure of an embodiment of an optical fiber amplifier used a double cladding fiber of the present invention.

Referring now to the drawings, an embodiment of the present invention is explained in detail. The embodiment of a double cladding fiber and an optical fiber amplifier of the present invention is shown in FIGS. 1 to 4.

Figure 2A:
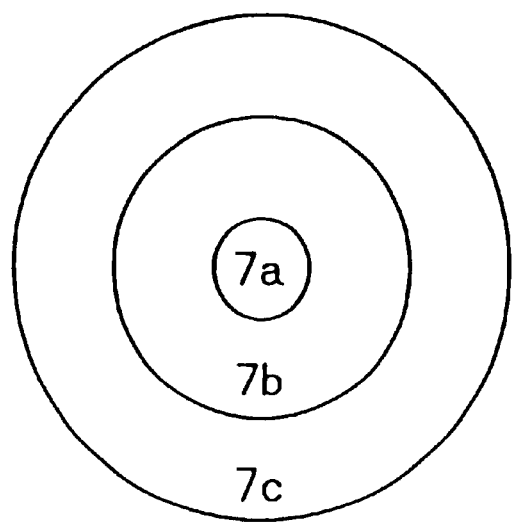
FIGS. 2A and 2B are a sectional view of a first double cladding fiber having a structure of concentric circles of the present invention and a lengthwise view of the fiber delineating the sections of differing refractive indices, respectively.
Figure 3:
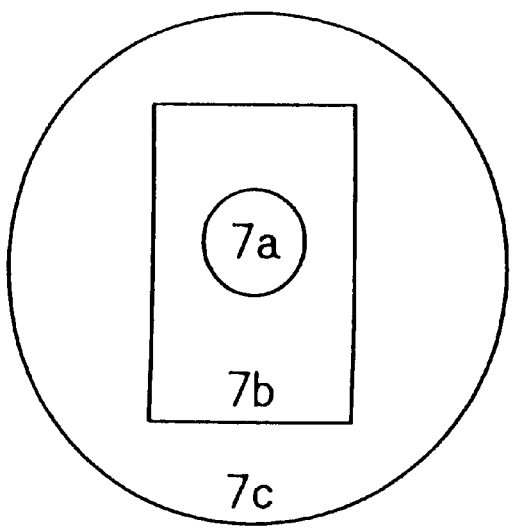
FIG. 3 is a sectional view of a second double cladding fiber having a structure of a rectangular shape as a first clad of the present invention.
Figure 2B:
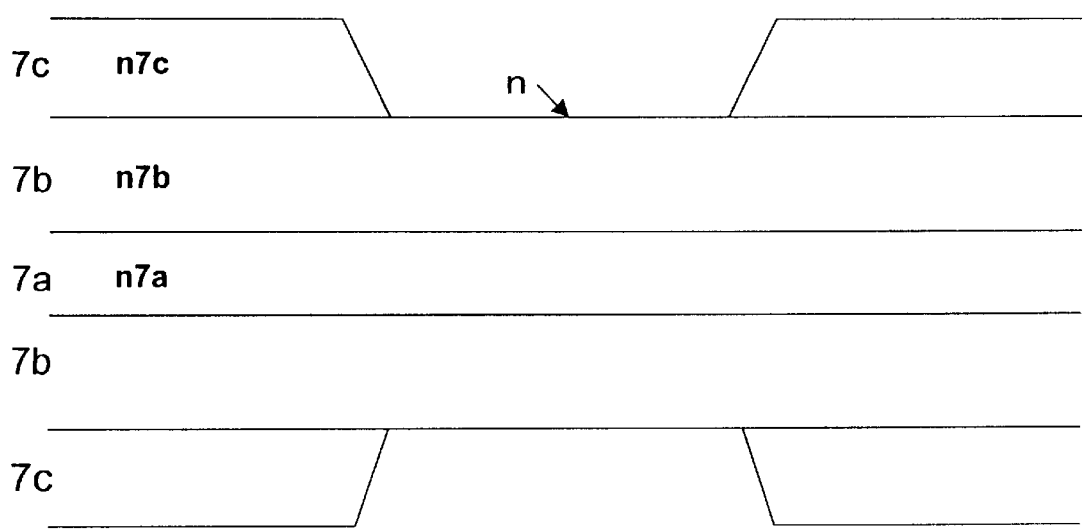
Figure 4:
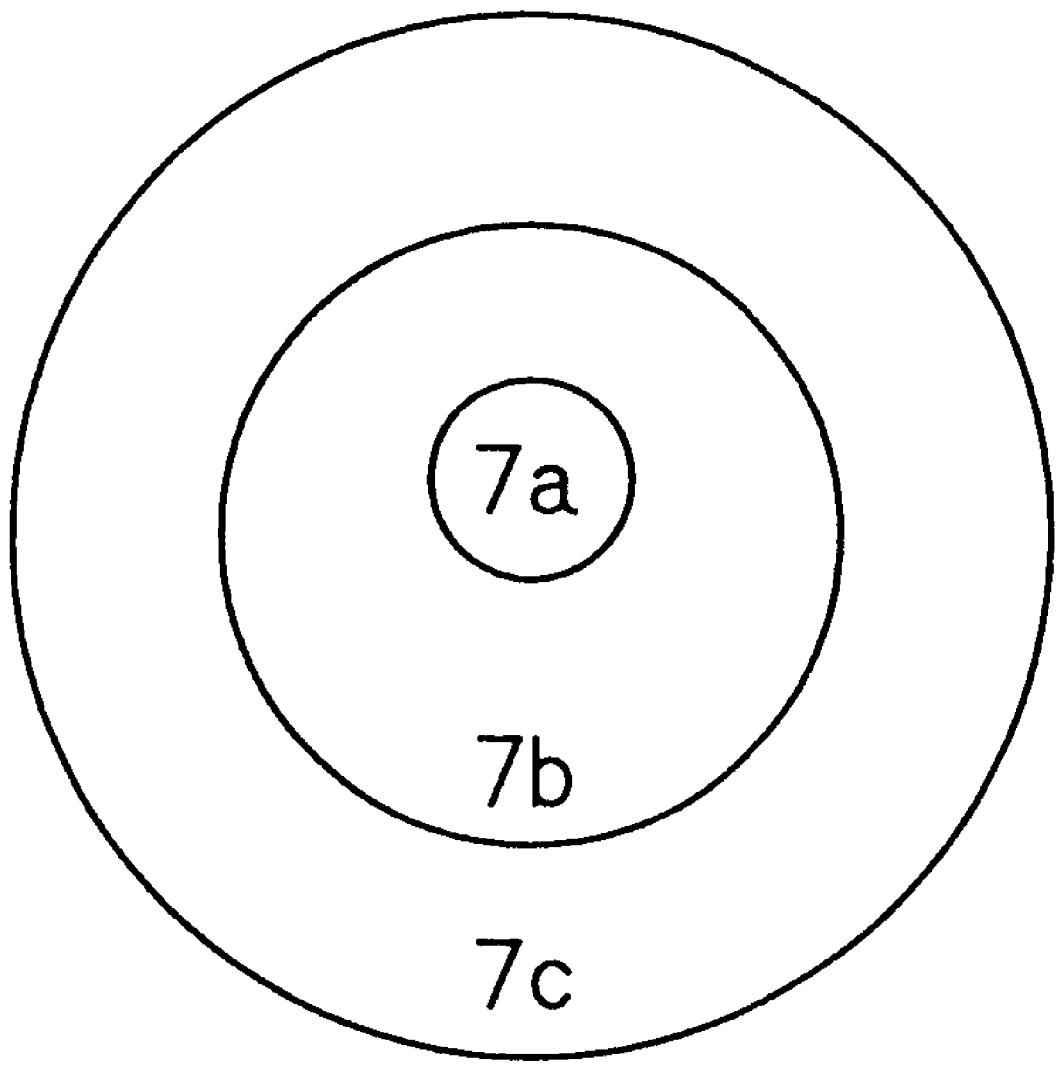
FIG. 4 is a sectional view of a third double cladding fiber having a structure positioning a core in an off center of the present invention.

FIG. 1 is a diagram showing a structure of the embodiment of the optical fiber amplifier used the double cladding fiber of the present invention. FIG. 2A is a sectional view of a first double cladding fiber having a structure of concentric circles of the present invention. FIG. 2B is a diagram showing a lengthwise view of a first double cladding fiber delineating the sections of differing refractive indices and showing a section of fiber wherein the second clad is removed and replaced with a designated length of coating of a higher refractive index than that of the original second cladding. FIG. 3 is a sectional view of a second double cladding fiber having a structure of a rectangular shape as a first clad of the present invention. FIG. 4 is a sectional view of a third double cladding fiber having a structure positioning a core in an off-center of the present invention.

As the same effect can be achieved by using any of the first or second or third double cladding fiber, the embodiment is explained by using the first double cladding fiber having the structure of concentric circles shown in FIG. 2A. As shown in FIG. 2A, a double cladding fiber 7 in FIG. 1 is composed of a core 7a, a first clad 7b and a second clad 7c. The core 7a transmits a signal light and has a "n 7a" refractive index. A small amount of rare-earth element is doped to the core 7a. The core 7a is covered with the first clad 7b whose refractive index is "n 7b", further the first clad 7b is covered with the second clad 7c whose refractive index is "n 7c". In this, the refractive indices have a relation that "n 7a">"n 7b">"n 7c".

A light providing amplification called a pumping light is input to the first clad 7b. The pumping light pumps the rare-earth element in the core 7a and acts for amplifying the signal light. The second clad 7c is provided to shut the pumping light into the first clad 7b.

As shown in FIG. 1, a signal light is inputting to the core 7a of a double cladding fiber 7 from a transmission line 1a via an optical splitter 2, an isolator 4, a wavelength division multiplex (WDM) coupler 5. The inputted signal light is split at the optical splitter 2, a part of the inputted signal light is inputted to a photodiode for monitoring input 3.

The WDM coupler 5 is connected to a pumping laser diode 6, and makes a pumping light power of the pumping laser diode 6 optically couple to the first clad 7b of the double cladding fiber 7. Almost all the output from the double cladding fiber 7 is an amplified signal light, but a part of the pumping light is leaked without being used for amplification. This amplified signal light is outputted to a transmission line 1b via an isolator 8 and an optical splitter 9. At the optical splitter 9, the amplified signal light is split and a part of the amplified signal light is inputted to a photodiode for monitoring output 10 for monitoring the outputting amount of the amplified signal light.

At an output end 71 of the double cladding fiber 7, the second clad n7c is removed by a designated length and a substance whose refractive index is "n" is coated at this removed part on the first clad 7b, in this "n">n7b.

The signal light has a wavelength being 1550 nm band and is inputted to the double cladding fiber 7 from the transmission line 1a via a fusing coupler in the optical splitter 2 which splits the signal light into about nine to one, the isolator 4 and the WDM coupler 5. At the optical splitter 2, about 10% of the inputted signal light is inputted to the photodiode for monitoring input 3. As mentioned above, the sectional structure of the double cladding fiber 7 used this embodiment is composed of the core 7a, the first clad 7b and second clad 7c as shown in FIG. 2, and the core and the clads are concentric circles, and these diameters ø are about 4 µm, 125 µm and 185 µm respectively.

A small amount of rare-earth element is doped to the core 7a for transmitting the signal light, whose refractive index is "n 7a". In this embodiment, erbium is doped as the rare-earth element. Therefore, as the pumping laser diode 6, a laser diode having 1480 nm wavelength band is adopted for pumping the erbium. At the output end 71 of the double cladding fiber 7, about 50 mm of only the second clad 7c is removed mechanically and the output end 71 is fused with the input end fiber of the isolator 8 in which the fiber diameter is about 125 µm.

A removed portion of the second clad 7c is coated with an epoxy resin whose refractive index is about 1.6. An output end of the isolator 8 connects to a fusing coupler of the optical splitter 9 which splits the amplified signal light into about nine to one, and about 10% of the amplified signal light is outputted to the photodiode for monitoring output 10. The remaining 90% are outputted to the transmission line 1b.

As the rare-earth element doped to the double cladding fiber, neodymium (Nd) can be used instead of erbium (Er). However, in this case, 0.8 µm band must be used as the wavelength of the signal light, and 1.1 µm must be used as the wavelength of the pumping laser diode 6. In the case of erbium doped fiber, as the wavelength of the pumping light, 980 nm band can be used instead of 1480 nm band.

Moreover, if the refractive index "n" of the coating material satisfies the condition "n">n 7b", any adhesive or dielectric resin can be used to coat the output end 71 of the double cladding fiber 7. Furthermore, from the view point of light absorption, a following process has the same effect, that is, a metal film made of chromium (Cr) or titanium (Ti) is formed on the outer surface of the first clad 7b by vapor deposition, or a conductive resin whose main material is silver is coated on the outer surface of the first clad 7b.

Next an operation of the embodiment is explained. A signal light of 1.55 µm band, for example, the wavelength is 1545 nm, is inputted to the core 7a of the double cladding fiber 7 from the transmission line 1a via the optical splitter 2, the isolator 4 and the WDM coupler 5. A pumping light from the pumping laser diode 6 is inputted to the first clad 7b of the double cladding fiber 7 from the same side of the signal light via the WDM coupler 5. At this time, a part of the pumping light is also inputted to the core 7a of the double cladding fiber 7.

Inside of the double cladding fiber 7, the pumping light transmits in a zigzag inside of the first clad 7b, in this process, the pumping light transmits across the core 7a. When the pumping light transmits across the core 7a, the energy is transferred to the signal light via erbium, therefore the signal light is amplified.

Inside of the first clad 7b, the pumping light transmits in a multi-mode, and a part of the pumping light not transmitted across the core 7a remains and this remaining part is outputted with the amplified signal light. However, at the output end 71 of the double cladding fiber 7, a length of about 50 mm of the second clad 7c is removed. This removed part is coated with an adhesive, whose refractive index is 1.6, when surrounding the first clad 7b. Therefore, at this approximate 59 mm length region, the pumping light transmitting the first clad 7b leaks to the adhesive side. As a result, the pumping light is not outputted from the output end of the first clad 7b.

On the other hand, the signal light transmitting the core 7a is not influenced by the adhesive in relation with the refractive index with the first clad 7b and is outputted.

In an experiment, a signal to noise ratio (SNR) of the signal light at the transmission line 1b is measured by using an oscilloscope. At an optical fiber amplifier, in which the second clad 7c is not removed, that is, the present invention is not applied, the SNR was about 9 dB. However, at the double cladding fiber and the optical fiber amplifier applied in the present invention, the SNR is largely improved to 11 dB.

As another embodiment of the present invention, at the output end of the double cladding fiber 7, after the second clad 7c is removed, process can be applied a silver paste is coated on the removed part, or a metal film made of chromium (Cr) or titanium (Ti) is formed by vapor deposition or is sputtered on the removed part. These processes also have the effect of removing the pumping light.

As mentioned above, the present invention can realize an equivalent effect to a pumping light cut filter with a simple structure at a double cladding fiber and an optical fiber amplifier.

In the embodiments of the present invention, the second clad 7c of the output end 71 of the double cladding fiber 7 is removed, and a substance having higher refractive index than the first clad 7b is coated on the removed part. With this, the pumping light is cut and the SNR of the outputting signal light can be largely improved.

As mentioned above, in the double cladding fiber of the present invention, the surrounding surface of the core 7a transmitting the signal light is covered with the first clad 7b whose refractive index is "n 7b", and the first clad 7b is covered with the second clad 7c. A designated length of the output end if the second 7c is removed and substance whose refractive index is "n" is coated at this removed part of second clad 7c on the first clad 7b, in this "n">"n 7b". With this structure, after the signal light is pumped, the remaining pumping light leaks to this coated part. That is, the the substance coated part can work as a filter for the pumping light. As a result, the SNR of the transmitting signal light can be largely improved.

While the present invention has been described with reference to the particular illustrative embodiment, it is not to be restricted by this embodiment but only by the appended claims. It is to be appreciated that those skilled in the art can change or modify the embodiment without departing from the scope and spirit of the present invention.

What is claimed is:

1. A double cladding fiber, comprising:
    a core, whose refractive index is n7a, transmits a signal light;
    a first clad, whose refractive index is n7b, covers the surrounding surface of said core; and
    a second clad, whose refractive index is n7c, covers the surrounding surface of said first clad,
    removing said second clad by a designated length at an output end, and
    coating a designated substance, whose refractive index is "n" ("n">n7b), at the part removed said second clad on said first clad.

2. A double cladding fiber in accordance with claim 1, wherein:
    said refractive indices have a relation that n7a>n7b>n7c.

3. A double cladding fiber in accordance with claim 1, wherein:
    a small amount of rare-earth element is doped in said core.

4. An optical fiber amplifier, comprising:
    a wavelength division multiplex (WDM) coupler, to which a signal light and a pumping light are inputted;
    an isolator from which an amplified signal light is outputted; and
    a double cladding fiber, which connects between said WDM coupler and said isolator, and consists of a core, whose refractive index is n7a, a first clad, whose refractive index is n7b, covering the surrounding surface of said core, and a second clad, whose refractive index is n7c, covering the surrounding surface of said first clad, and a designated length of said second clad is removed at an output end, and a designated substance, whose refractive index is "n" ("n">n7b), is coated at the part removed said second clad on said first clad.

5. An optical fiber amplifier in accordance with claim 4, wherein:
    said refractive indices have a relation that n7a>n7b>n7c.

6. An optical fiber amplifier in accordance with claim 4, wherein:
    a small amount of rare-earth element is doped in said core.

* * * * *